April 13, 1965 W. H. SCHNACKE 3,178,103
ROTARY COMPRESSOR
Filed Aug. 16, 1963 2 Sheets-Sheet 1
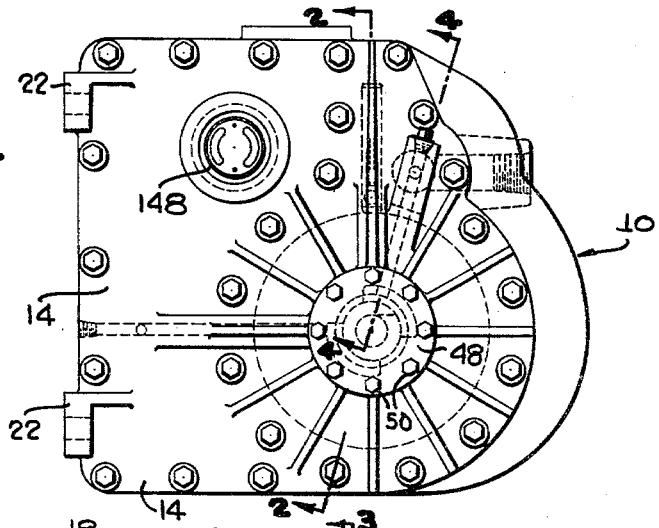
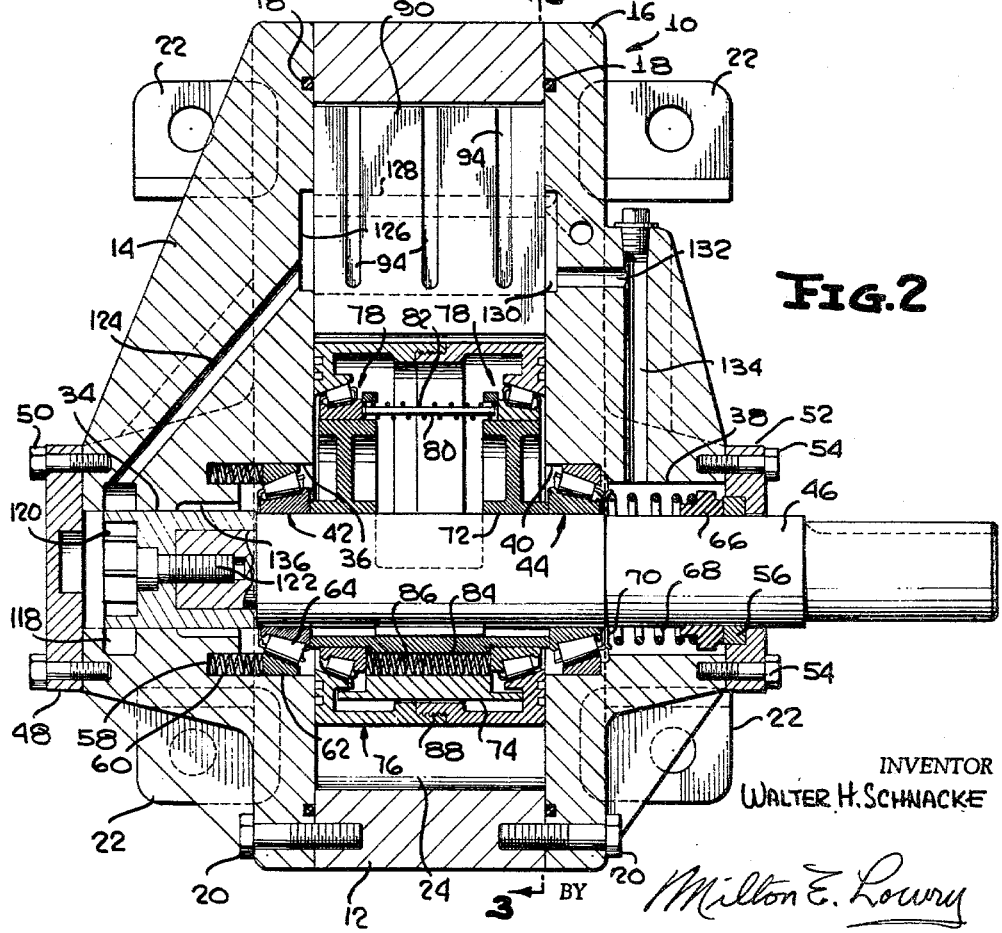
INVENTOR
WALTER H. SCHNACKE
BY Milton E. Lowry
ATTORNEY April 13, 1965  W. H. SCHNACKE  3,178,103
ROTARY COMPRESSOR
Filed Aug. 16, 1963  2 Sheets-Sheet 2

INVENTOR
WALTER H. SCHNACKE
BY Milton E. Lowry
ATTORNEY

United States Patent Office 3,178,103
Patented Apr. 13, 1965

3,178,103
ROTARY COMPRESSOR
Walter H. Schnacke, 1016 E. Columbia St.,
Evansville, Ind.
Filed Aug. 16, 1963, Ser. No. 302,528
20 Claims. (Cl. 230—145)

This invention relates in general to new and useful improvements in rotary fluid power units, and more particularly to a novel rotary compressor.

In the presently used type of rotary compressor, there is no satisfactory method for properly lubricating the components to take care of a suitably close fit of the components due to the unequal heat conditions which cause unequal expansions and contractions, nor is there a way to eliminate wear appreciably or a satisfactory means for taking up wear in the parts.

In view of the foregoing, it is the primary object of this invention to provide in a rotary fluid power unit, particularly rotary compressors, a lubrication system which provides for the flow of lubricant through all of the working components of the unit and through all areas of the unit where undue heating normally occurs whereby there is an equalization of the heating of the various components of the unit and the usual hot spots in such unit are eliminated.

Another object of this invention is to provide means for automatically taking up for wear in the various bearings of a rotary fluid power unit, such as air compressors, whereby the desired fit or tolerance is maintained at all times.

Another object of this invention is to decrease the wear of the usual sliding valve assembly or sliding blade of a rotary compressor by a novel lubricating system which bathes and surrounds the sliding blade through the continuous row of lubricating fluid, thereby providing a constant self-healing oil seal between the sliding blade and the surrounding housing portion.

Still another object of this invention is to provide a novel method of lubricating a piston and cylinder wall of a rotary compressor, the compressor having a full flow oil system and the oil flowing longitudinally of a shaft of the compressor and through bearings between the shaft and the piston with the bearings being opened to the walls of the cylinder so that as the bearings are lubricated, a portion of the oil is directed against the walls of the cylinder to thereby lubricate the exterior of the piston and the cylinder walls.

A further object of this invention is to provide a self-adjusting bearing arrangement for rotary components, the bearing arrangement including tapered bearings having components which are mounted for movement, and there being provided spring means constantly urging the components in a direction whereby the desired adjustment of the tapered bearings is automatically accomplished so as to maintain the intended adjustment, a variation of the strength of the springs controls automatically the top pressure operation; also adjusts in case of a slug liquid refrigerant.

Still another object of this invention is to provide a novel lubrication system for a rotary compressor, the lubrication system including a lubricant flow passage which passes through the customary discharge valve of the compressor so as to eliminate the usual hot-spot found in the discharge valve; by carrying heat to a place of lower temperature, circulates oil and heat, equalizes expansion and contraction.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevational view of a rotary compressor formed in accordance with this invention.

FIGURE 2 is a longitudinal sectional view taken generally along the line 2—2 of FIGURE 1 and is of a larger scale.

Figure 3:
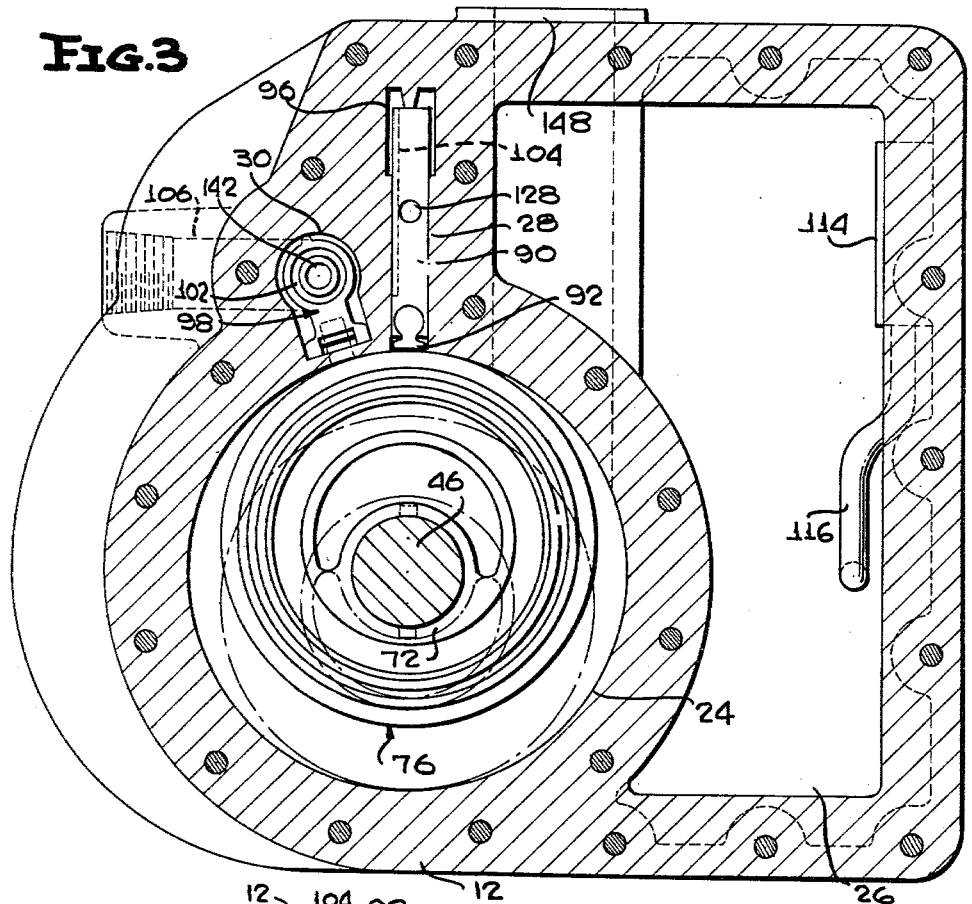
FIGURE 3 is a transverse vertical sectional view taken along the line 3—3 of FIGURE 2 and shows further the internal construction of the rotary compressor.

Referring now to the drawings in detail, it will be seen that there is illustrated a rotary compressor which is generally referred to by the numeral 10. The rotary compressor 10 includes a central housing member 12 having housing end plates 14 and 16 securely connected to opposite faces thereof and sealed thereto by means of O-rings 18. The housing end plates 14 and 16 are secured to the central section 12 by means of bolts, such as the bolts 20 shown in the lower portion of FIGURE 2. The housing end plates 14 and 16 are provided with suitable mounting ears 22.

Figure 4:
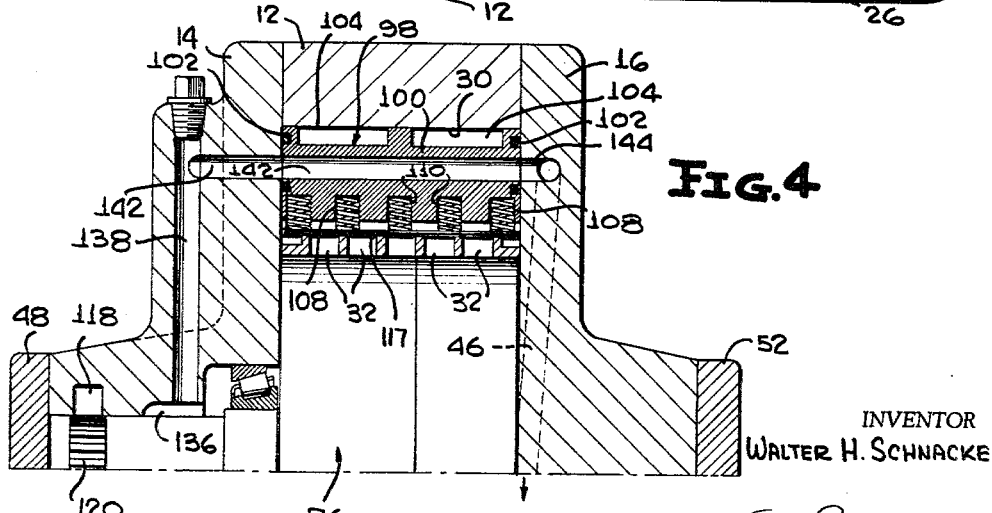
FIGURE 4 is an enlarged fragmentary sectional view taken generally along the line 4—4 of FIGURE 1 and shows the specific details of the discharge valve of the rotary compressor.

Referring now to FIGURE 3 in particular, it will be seen that the housing center section 12 is contoured to define a rotary chamber or cylinder 24 and an oil reservoir 26, the oil reservoir 26 being disposed adjacent the rotary chamber 24. Also, the housing center section 12 is configurated to define a vertically disposed, radially extending recess 28 which opens into the chamber 24, and a socket 30 which is disposed adjacent to the recess 28 and which is closely spaced, but separated from the chamber 24. As is best shown in FIGURE 4, a plurality of ports 32 open from the chamber 24 into the socket 30.

The end plate 14 is provided with a bore 34 which is disposed coaxial with the chamber 24. The bore 34 is provided with an enlarged inner portion 36. The end plate 16 is also provided with a bore which is coaxial with the chamber 24, this bore being referred to by the numeral 38 and having an enlarged inner portion 40. A tapered bearing 42 is seated in the bore portion 36 and a similar tapered bearing 44 is seated in the bore portion 40. A drive shaft 46 for the rotary compressor is rotatably journalled by means of the bearings 42 and 44 and extends through the chamber 24. It is to be noted that the shaft 46 does not extend all the way through the end plate 14, and the other end of the bore 34 is closed by means of a cover plate 48 which is secured in place by bolts 50. The shaft 42 extends entirely through the end plate 16 and the other end of the bore 38 is closed by a cover plate 52 through which the shaft 46 passes. The cover plate 52 is securely placed by means of bolts 54 and is provided with a suitable sealing ring 56 which engages the shaft 46.

The end plate 14 is provided with a plurality of sockets 58 which extends longitudinally of the shaft 46 and are circumferentially spaced therearound. In each of the sockets 58 there is disposed a coil spring 60 which bears against an outer race 62 of the tapered bearing 42. An inner race 64 of the tapered bearing 42 is fixed on the shaft 46. Accordingly, the spring 60 constantly urge the outer race 62 to a bearing adjusting position so that when there is any bearing wear or looseness of the parts, this wear is automatically compensated for.

The shaft 46 is provided within the bore 38 with a collar 66. A coil spring 68 surrounds the shaft 46 and has one end engaged with the collar 66. The opposite end of the coil spring 68 bears against a thrust washer 70 which, in turn bears against the bearing 44 to maintain the adjustment of the bearing 44.

The shaft 46 is provided with a centrally located eccentric 72 which is aligned with and disposed within the chamber 24. The eccentric 72 is partially of a solid construction and partially of a hollow construction so as to incorporate a counterweight 74 which provides for a balanced shaft condition. The eccentric 72 carries a piston generally referred to by the numeral 76. The piston 76 is mounted on the eccentric 72 assisting to effectuate an automatic adjustment by means of two tapered bearings 78 of which the piston itself forms the outer race. The inner races of the bearings 78 are slidably seated on the eccentric 72. Certain portions of the piston 76 are provided with rods 80 on which coil springs 82 are mounted. Other portions of the piston 74 are provided with bores 84 in which coil springs 86 are mounted. The coil springs 82 and 86 bear against the inner races of the bearings 78 and effect the automatic adjustment of the bearings 78; and also provide an anti-slug feature. At this time it is pointed out that the piston 76 is of the two-piece construction with the two halves of the piston being threaded together, such as at 88.

Referring now to FIGURE 3 in particular, it will be seen that there is illustrated a sliding seal or blade 90 which is mounted within the recess 28. The sliding blade 90 carries a removable blade member 92 which may or may not be formed of a magnetic material to assure the constant riding thereof against the outer surface of the piston 76 and the forming of the required seal between the sliding blade 90 and the piston. The sliding blade 90 is provided along the outer surface thereof with a plurality of ports 94 (see FIGURE 2) which opens into a chamber 96 at the outer end of the recess 28. When the piston 76 rotates to a position wherein the blade 90 is lowered, pressure from within the chamber 44 will pass up through the port or passages 94 into the chamber 96 so that a pressure is built up in the chamber 96. This pressure resists the upward movement of the sliding blade 90 and eliminates the bounce of the blade 90 as it reaches its uppermost position, as is shown in FIGURE 3. If desired, the pressure chamber 96 may be supplemented by means of suitable springs, not shown.

The sock 30 has disposed therein a discharge valve, generally referred to by the numeral 98. The discharge valve 98 includes a valve body 100 which is sealed relative to the end plates 14 and 16 by means of O-rings 102. The valve body 100 is provided with passages 104 therearound which open into a discharge port 106, as is shown in FIGURE 3. The lower portion of the valve body 100 is provided with sockets 108 in which there are seated springs 110 which bear against a resilient valve member 112. The valve member 112 is held by the springs 110 against the bottom wall of the pocket 30 so as to close the ports 32. However, when pressure is built up within the chamber 24, the valve member 112 is forced outwardly with the result that compressed air will flow through the ports 32, around the valve body 100 and out through the discharge port or passage 106. At this time it is pointed out that no specific intake passage has been illustrated. However, this is conventional as in other rotary compressors.

The rotary compressor 10 has a novel lubrication system which includes a screen 114 mounted within the reservoir 26, as is shown in FIGURE 3. A pick-up tube 116 delivers oil passing through the screen 114 to an annular passage 118 extending around the bore 34. An impellor 120 forces the oil outwardly with the result that the oil flows through an upwardly sloping passage 124 into a port 126 disposed in the face of the end plate 114 opposing the center section 12. The port 126 is aligned with the recess 28 and serves to lubricate one side of the sliding blade 90. The sliding blade 90 has an oil passage 128 therethrough which is constantly aligned with the port 126 despite the fact that the sliding blade 90 is continuously reciprocating.

The end plate 16 is provided with a port 130 which corresponds to the port 126. The port 130 receives oil from the oil passage 128 and at the same time serves to lubricate the opposite face of the sliding plate 90. An oil passage 132 extends from the port 130 into an oil passage 134 which opens into the bore 38. The oil then flows through the bore 38 along the shaft 46 through the tapered bearing unit 44 to lubricate the same. As is shown in the lower portion of FIGURE 2, the oil passing through the tapered bearing 44 is fed into the tapered bearing 78 and this oil is moved upwardly around the shaft eccentric 72 with the tapered bearing 78 so that the oil may pass through the portion of the piston which is hollow. At the same time, a portion of this oil passes out through the piston 76 against the wall of the chamber 24 defined by the end plate 16. The oil, under pressure, passes through the piston 76 and out through the tapered bearing 78 at the left side of the piston, as seen in FIGURE 2. The oil passing through the left tapered bearing 78 lubricates the wall of the chamber 24 defined by end plates 14 and also passes out through the tapered bearing 42. The oil returning through the tapered bearing 42 passes into the bore 34 to the right of the impellor 20 and is forced outwardly through an annular passage 136 surrounding the bore 34 and up through a passage 138 in the end plate 14. The oil passes through the passage 138 into a passage 140 which is aligned with an oil passage 142 extending through the discharge valve body 100. The oil passing through the discharge valve body 100 is received in a passage 144 and then passes into a downwardly directed passage 146 for return to the oil reservoir 26. Incidentally, it is pointed out that the oil reservoir 26 is provided with a sight glass unit 148 to facilitate the determination of a level of oil therein.

It will be apparent that a lubrication system of the rotary compressor 10 is such that there is a thorough lubrication of all moving parts of the rotary compressor. In addition, by providing flow of lubricating oil through all of the components of the rotary compressor which are subject to unequal heating, it will be seen that the unequal heating will be balanced out and the usual hot spots, as well as cold spots, eliminated. In addition, through the automatic adjustment of the several tapered bearings of the rotary compressor, it will be seen that any wear that does exist is automatically compensated for, and therefore the desired tight fit of the components is maintained. Incidentally, the tapered bearings will be compressed initially to maintain a proper bearing relationship at all times.

Although a preferred embodiment of the invention has been specifically illustrated and described herein, it is to be understood that other modifications may be made in the invention within the spirit and scope thereof, as defined in the appended claims.

I claim:

1. A rotary pressurized fluid power unit comprising a housing defining a chamber, a shaft rotatably journaled in said housing and having an eccentric disposed within said chamber, a piston, at least a pair of axially spaced tapered bearing elements mounted on said eccentric and supporting said piston for rotation relative to said eccentric, said elements each including an inner and an outer bearing race, said races confiningly engaging and retaining a plurality of tapered rollers, a plurality of spring means disposed within said piston and reacting on said races for urging the race surfaces thereof toward each other, said plurality of spring means including a coil spring disposed with its axis generally parallel to the axis of said shaft, and means retaining each of said coil springs in the respective positions thereof.

2. The fluid power unit as defined in claim 1 wherein said retaining means includes at least one rod fixed between opposed ones of said axially spaced bearing races, and one of said coil springs is in external telescopic relationship relative to said one rod.

3. The fluid power unit as defined in claim 1 wherein said retaining means includes at least a single bore in said piston having an axis parallel to the axis of said shaft, and one of said coil springs being received in said single bore with opposite end portions of said one coil spring in abutting contact with one of said axially spaced bearing races whereby race surfaces thereof are constantly biased toward a portion taking-up wear thereof.

4. The fluid power unit as defined in claim 1 wherein said retaining means includes at least one rod fixed between opposed ones of said axially spaced bearing races and at least a single bore in said piston, one of said coil springs being in external telescopic relationship relative to said one rod, another of said coil springs being in internal telescopic relationship relative to said bore, and said springs each urging axially spaced ones of said races toward other axially spaced ones of said races whereby the race surfaces thereof are constantly biased toward a position taking-up wear thereof.

5. The fluid power unit as defined in claim 1 including anti-slug means operative at least in part by said coil springs.

6. A rotary pressurized fluid power unit comprising a housing defining a chamber, a shaft extending through said chamber and carrying a piston disposed within said chamber, bearings rotatably journalling said shaft and piston, a radial recess opening outwardly from said chamber in said housing, a sealing blade slidably mounted in said housing recess for sealing contact with said piston, and a lubricating system for delivering lubricant to and through said blade and said bearings, said lubricating system including ports at opposite sides of said recess, and first passage means wholly in said blade placing said ports in fluid communication.

7. The fluid power unit of claim 6 wherein said sealing blade carries a removable blade member in constant contact with said piston.

8. A rotary pressurized fluid power unit comprising a housing defining a chamber, a shaft rotatably journalled in said housing and having an eccentric disposed within said chamber, a piston, at least a pair of axially spaced tapered bearing elements mounted on said eccentric and supporting said piston for rotation relative to said eccentric, said elements each including an inner and an outer bearing race, said races confiningly engaging and retaining a plurality of tapered rollers, a plurality of spring means disposed within said piston and reacting on said races for urging the race surfaces thereof toward each other, said spring means including at least a single coil spring disposed with its axis generally parallel to the axis of said shaft, means retaining said single coil spring in constant biasing relationship to said elements for urging the race surfaces thereof toward positions taking-up wear, a radial recess opening outwardly of said chamber in said housing, a sealing blade slidably mounted in said recess having a removable blade member in sealing contact with said piston, a lubrication system for delivering lubricant to and through said blade, said system including opposed port means in fluid communication with said bearing elements, and passage means wholly in said blade placing said port means in fluid communication at all times irrespective of the position of said blade.

9. A rotary pressurized fluid power unit comprising a housing defining a chamber, a shaft rotatably journalled in said housing and having an eccentric disposed within said chamber, a piston, tapered bearing elements mounted on said eccentric and supporting said piston for rotation relative to said eccentric, and spring means disposed within said piston reacting on said tapered bearing elements to maintain a constant adjustment thereof.

10. A rotary unit comprising a housing, a shaft, tapered bearing assemblies mounted within said housing and journalling said shaft for rotation, opposed resilient means reacting on said tapered bearing units to retain said tapered bearing units in constant adjustment, said housing defining a chamber and said shaft having an eccentric disposed within said chamber, a piston, tapered bearing elements mounted on said eccentric and supporting said piston for rotation relative to said eccentric, and spring means disposed within said piston reacting on said tapered bearing elements to maintain a constant adjustment thereof.

11. The power unit of claim 10 together with a lubrication system for directing lubricant along said shaft and through said tapered bearing units and elements.

12. A rotary pressurized fluid power unit comprising a housing defining a chamber, a shaft extending through said chamber and carrying a piston disposed within said chamber, bearings rotatably journalling said shaft and piston, a radial recess opening outwardly from said chamber in said housing, a sealing blade slidably mounted in said housing recess for sealing contact with said piston, and a lubricating system for delivering lubricant to and through said blade and said bearings.

13. The fluid power unit of claim 12 wherein said lubrication system includes opposed ports at opposite sides of said recess and a passage through said blade aligned with said ports at all times and with said blade covering said ports at all times whereby said blade is simultaneously lubricated and functions as part of the lubrication system.

14. The fluid power unit of claim 12 wherein lubricant first passes through said blade and then through said bearings.

15. A rotary pressurized fluid power unit comprising a housing defining a chamber, a shaft extending through said chamber and carrying a piston disposed within said chamber, bearings rotatably journalling said shaft and piston, a radial recess opening outwardly from said chamber in said housing, a sealing blade slidably mounted in said housing recess for sealing contact with said piston, a discharge valve disposed outwardly of said chamber, and a lubrication system for delivering lubricant to and through said blade, said bearings and said discharge valve.

16. The fluid power unit of claim 15 wherein said lubrication system includes opposed ports at opposite sides of said recess and a passage through said blade aligned with said ports at all times and with said blade covering said ports at all times whereby said blade is simultaneously lubricated and functions as part of the lubrication system.

17. The fluid power unit of claim 15 wherein said housing includes a lubricant reservoir and a pump receiving lubricant from said reservoir, and wherein lubricant from said pump first passes through said blade, then through said bearings and finally through said discharge valve before returning to said reservoir whereby a balanced heat condition is maintained.

18. The fluid power unit of claim 17 wherein said pump has a pump chamber defined by said housing and an impellor carried by said shaft.

19. The fluid power unit of claim 15 wherein a portion of the lubricant passing through said bearings enters into said chamber between walls of said chamber and said piston.

20. The fluid power unit of claim 15 wherein said housing includes a lubricant reservoir and a pump receiving lubricant from said reservoir, and wherein lubricant from said pump passes through said bearings, passes through said piston, passes through said blade and finally through a spool discharge valve returning to said reservoir without unequal heating of the said parts and components by the transfer of the heat by said lubricant from the hotter portions of the unit to the relatively cooler portions of the unit.

References Cited by the Examiner

UNITED STATES PATENTS

| | | | |
|---|---|---|---|
| 2,020,987 | 11/35 | Ayres | 230—138 |
| 2,583,633 | 1/52 | Cronin | 103—123 |
| 2,916,999 | 12/59 | Christenson | 103—130 |
| 2,969,020 | 1/61 | Fazekas | 103—123 |
| 2,991,931 | 7/61 | Galin | 230—145 |

FOREIGN PATENTS

| | | |
|---|---|---|
| 210,439 | 9/57 | Australia. |
| 917,431 | 9/54 | Germany. |
| 130,803 | 8/19 | Great Britain. |

KARL J. ALBRECHT, *Primary Examiner.*

WILBUR J. GOODLIN, *Examiner.*